United States Patent
Tseng et al.

(10) Patent No.: US 6,477,480 B1
(45) Date of Patent: Nov. 5, 2002

(54) METHOD AND APPARATUS FOR DETERMINING LATERAL VELOCITY OF A VEHICLE

(75) Inventors: Hongtei Eric Tseng, Canton, MI (US); Davorin David Hrovat, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 79 days.

(21) Appl. No.: 09/713,712

(22) Filed: Nov. 15, 2000

(51) Int. Cl.[7] .............................................. G06E 15/00
(52) U.S. Cl. ...................................... 702/142; 702/127
(58) Field of Search .............................. 701/1, 70, 72, 701/41, 36; 180/140, 141, 412; 303/146, 139; 364/426.01

(56) References Cited

U.S. PATENT DOCUMENTS

| | | | |
|---|---|---|---|
| 4,597,462 A | * 7/1986 | Sano et al. | .................. 180/140 |
| 4,872,116 A | 10/1989 | Ito | |
| 5,311,431 A | 5/1994 | Cao | |
| 5,627,756 A | * 5/1997 | Fukada et al. | ......... 364/426.01 |
| 5,676,433 A | 10/1997 | Inaqaki | |
| 5,742,918 A | 4/1998 | Ashrafi | |
| 5,742,919 A | * 4/1998 | Ashrafi et al. | .................. 701/70 |
| 6,073,065 A | * 6/2000 | Brown et al. | ................... 701/36 |
| 6,161,905 A | * 12/2000 | Hac et al. | .................... 303/146 |

* cited by examiner

*Primary Examiner*—John S. Hilten
*Assistant Examiner*—Xiugin Sun
(74) *Attorney, Agent, or Firm*—Gregory P. Brown

(57) ABSTRACT

A method and apparatus for determining lateral velocity of a vehicle (10) uses a controller (16) having a lateral velocity estimator (18) therein. A vehicle speed determination circuit (20) is used to determine the vehicle speed which is coupled to the controller (16). A yaw rate sensor (26) is used to generate a yaw rate signal, a lateral acceleration signal (28) is used to generate a lateral acceleration signal, and a roll angle sensor (30) is used to generate a roll angle signal that are each coupled to controller (16). The controller (16) measures an unbiased lateral velocity derivative and determines a fictitious lateral velocity estimation using the unbiased lateral velocity derivative. Using the fictitious error to drive a model based adaptive observer, an accurate lateral velocity determination may he made in spite of model uncertainties and measurement noise.

14 Claims, 1 Drawing Sheet

METHOD AND APPARATUS FOR DETERMINING LATERAL VELOCITY OF A VEHICLE

TECHNICAL FIELD

The present invention relates generally to determining the dynamic state of an automotive vehicle, and more particularly, to a method and apparatus for determining lateral velocity of an automotive vehicle.

BACKGROUND

Stability control systems are increasingly being used on automotive vehicles to improve the stability of the vehicle during operation. Such systems use the vehicle lateral velocity in determining the dynamic state of the vehicle. Lateral velocity may be directly measured by instrumental sensors such as optical sensors or global positioning sensors. However, there are practical considerations such as high cost, signal degradation, and lost of signal during certain weather/environment conditions that inhibit production vehicles from using these sensors presently.

Various types of lateral velocity estimation techniques have been proposed. Each, however, has undesirable drawbacks which may lead to inaccurate lateral velocity determinations. For example, one known method assumes that the tires are operating in a linear. region with known cornering stiffness. However, as in many circumstances, the tires may not operate in a linear region during the changing dynamic states of the vehicle.

Another important factor in determining lateral velocity of a vehicle is measurement noise and the effect of measurement noise on the lateral velocity determination. To provide a robust system, the measurement noises from such sensors as lateral acceleration or velocity must be minized and must not excite errors in convergence algorithms. One significant source of measurement noise to consider is the variation in road bank and/or vehicle attitude.

In the paper by Kaminaga and Naito, "Vehicle Body Slip Angle Estimation Using An Adaptive Observer", an adaptive observer using a sliding mode approach is proposed. However, this approach requires the estimation error of lateral velocity as an input to the parameter adaptation algorithm to guarantee stability. This, of course, is not possible since the true lateral velocity is not known. Then, the estimation error in the lateral velocity derivative is used as a substitute signal. It is argued that the effect of cornering stiffness (i.e., the adapted parameter) will have a similar effect on both the error of lateral velocity and the error of its derivative. Although the argument may be valid for certain low frequency maneuvers, it is believed to be inaccurate for other maneuvers. Without the robustness property for a wide variety of maneuvers that a vehicle may experience, their approach is undesirable for use in a dynamic control system of a production vehicle. Furthermore, such a system also is believed not to compensate for sensor bias experienced during a banked road condition.

U.S. Pat. No. 5,676,433 also proposes a device for estimating side slide velocity of a vehicle. The side slide velocity is determined by integrating on a time basis the difference between a lateral acceleration detected by the lateral acceleration detection: means and the product of the yaw rate and the longitudinal velocity by using only the high frequency components of the lateral acceleration and yaw rate. This approach, of course, is very sensitive to the inaccuracy of all the above signals since the integration procedure substantially amplifies low frequency error. Since the '433 patent suggested a high pass filtering process, the method cannot differentiate a sustained increase/decrease in lateral velocity (i.e. real signal in low frequency/dc) from a sustained low frequency/DC sensor noise.

It is therefore one object of the invention to provide a robust determination for lateral velocity of the vehicle that maintains high accuracy by incorporating or compensating for various dynamic conditions of the vehicle.

SUMMARY OF THE INVENTION

It is therefore one object of the invention to provide an improved method and apparatus for determining lateral velocity.

In one aspect of the invention a method for determining lateral velocity of a vehicle comprises the steps of:

determining an -unbiased lateral velocity derivative;

creating a fictitious lateral velocity estimation error; and, determining a lateral velocity by feeding the fictitious lateral velocity estimation error into an adaptive observer.

One advantage of the invention is that various dynamic conditions of the vehicle are taken into consideration such as, transitioning road surfaces, varying corner stiffness, road surfaces and bank angle variations, and various sensor constraints.

Other objects and features of the present invention will become apparent when viewed in light of the detailed description of the preferred embodiment when taken in conjunction -with the attached drawings and appended claims.

DESCRIPTION OF THE PREFERRED EMBODIMENT

In the following description various formulas and examples are given by way of example. However, those skilled in the art will recognize various alternatives.

The present invention determines lateral velocity of a vehicle by measuring an unbiased lateral velocity derivative and creates a fictitious lateral velocity estimation error by integrating an error of an estimated lateral velocity derivative subtracting the product of a forgetting factor and the fictitious error. The fictitious lateral velocity estimation error is used in an adaptive observer. The present invention nearly eliminates any significant effect that may be induced from integrating the DC bias from model uncertainties and/or measurement noise. The fictitious estimation error is capable of insuring the adaptive algorithm to achieve both parameter convergence and estimation stability.

Figure 1:
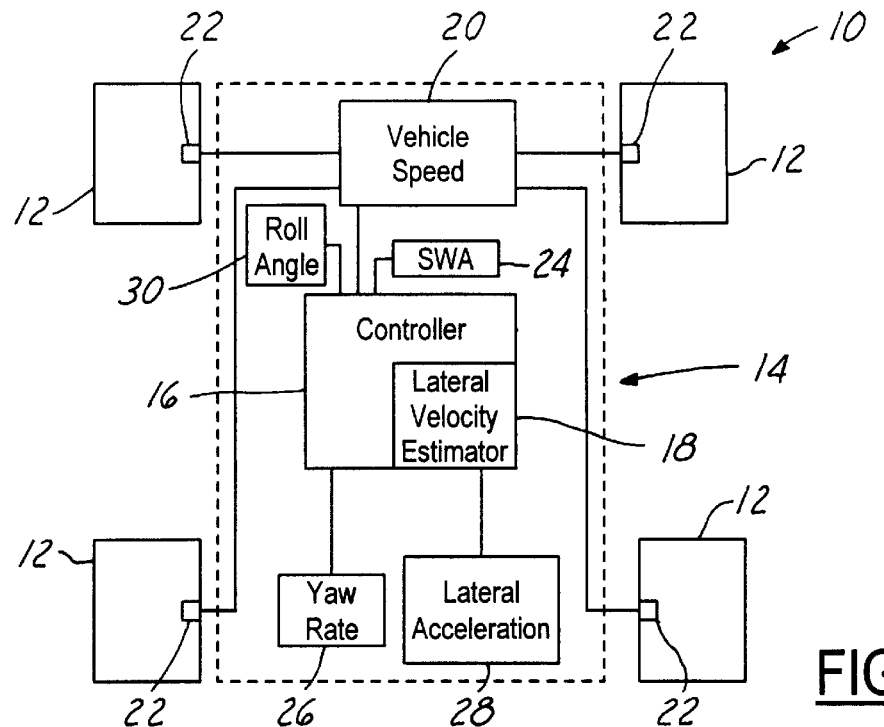
FIG. 1 is a block diagrammatic view of an automotive vehicle having a controller used to determine lateral velocity according to the present invention.

Referring now to FIG. 1, an automotive vehicle 10 is illustrated having wheels 12 and a lateral velocity estimation circuit generally shown as 14. Lateral velocity estimation circuit 14 has a controller 16 that is preferably microprocessor-based. Controller 16 may be a controller dedicated only to lateral velocity estimation. However, controller 16 is preferably part of a stability control system for an automotive vehicle. As illustrated, controller 16 has a lateral velocity estimator 18 illustrated therein. Controller 16, and therefore a lateral velocity estimator 18, uses various output signals from various sensors in the vehicle.

One output signal used by controller 16 for determining lateral velocity is vehicle speed. Vehicle speed. may be determined by a vehicle speed circuit 20. As illustrated, vehicle speed circuit 20 is a separate component. However, vehicle speed circuit may be formed as part of controller 16 and may possibly be implemented entirely in software. Vehicle speed circuit 20 is coupled to wheel sensors 22 positioned at each of the wheels. Wheel sensors 22 each sense the rotational speed of the wheels 12 in a conventional manner. One suitable type of wheel sensor is a toothed wheel sensor commonly employed in anti-lock brake systems. In such systems, a toothed wheel rotates with wheel 12 and a sensing pickup senses the pulses from the toothed wheel. To determine the vehicle velocity, the signals may be combined in various manners such as by averaging. Compensation for erroneous signals out of a predetermined range may also be used. Those skilled in the art will recognize other types of vehicle speed sensing may also be derived or directly obtained from other components of the vehicle such as the engine controller, engine, transmission.

A steering wheel angle sensor 24, a yaw rate sensor 26, a lateral. acceleration sensor 28 and a roll angle sensor 30 are also used in the estimation of lateral velocity of the vehicle. Steering wheel angle sensor 24 provides an output signal corresponding to the position of the hand wheel of automotive vehicle 10. Yaw rate sensor 26 provides an output signal corresponding to the rate of yaw of the automotive vehicle about the center of mass of the vehicle. Lateral acceleration sensor 28 provides an output signal to controller 16 that corresponds to the lateral acceleration of the vehicle at the center of mass of. the vehicle. Roll angle sensor 30 generates an output signal corresponding to the roll angle of the vehicle. Although roll angle 30 is shown as a roll angle sensor, the roll angle may be determined using a roll rate sensor and deriving the roll angle therefrom. Such a determination is known in the art.

Figure 2:
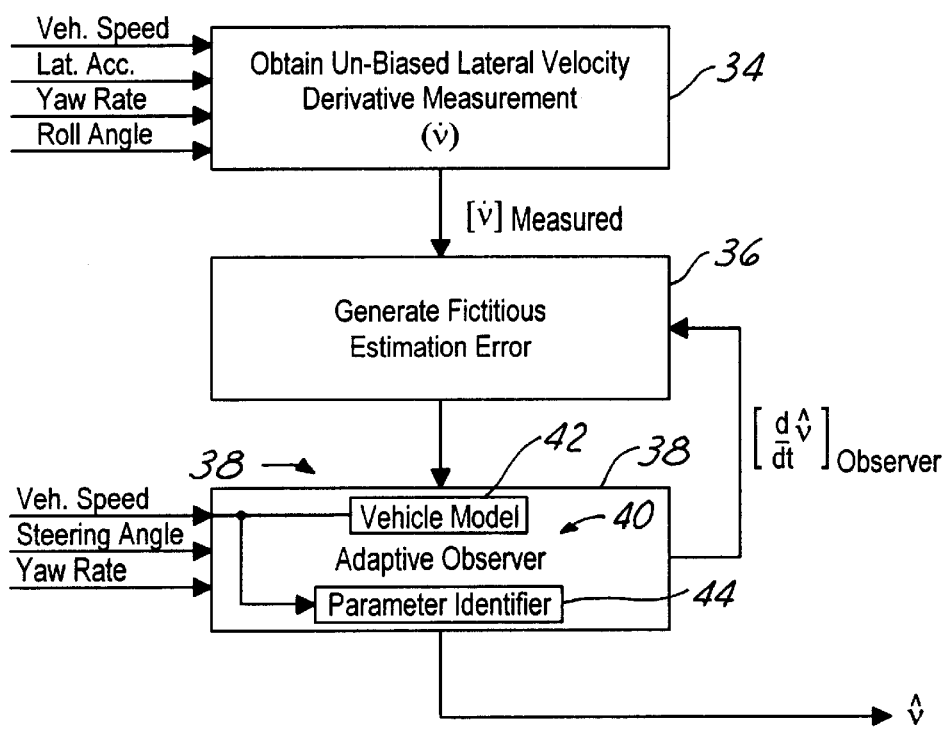
FIG. 2 is a block diagrammatic flow chart of a method for determining lateral velocity according to the present invention.

Referring now to FIG. 2, the method of determining lateral velocity of a vehicle is generally set forth in steps 34, 36, and 38. The various sensor inputs from FIG. 1 are used in step 34 and therefore are shown as input signals to block 34. Vehicle speed, lateral acceleration, yaw rate, and roll angle are all shown as input signals to block 34. An 'unbiased' lateral velocity derivative is determined by the formula:

$$\dot{v} a_y - \omega.u + g \sin \phi$$

where $a_y$ is the lateral. acceleration signal, $\omega$ is the yaw rate signal, u is the vehicle speed, $\phi$ is the vehicle roll angle. The term unbiased means that the effect of the attitude of the vehicle on the lateral velocity derivative measurement has been substantially minimized.

As mentioned above, the roll angle of the vehicle may be determined using a roll rate sensor. If measurement is not available, an estimated roll angle can be used instead. The estimated roll angle may be obtained from an road bank angle estimate such as that described in U.S. Pat. No. 6,073,065 or a combination of the road bank angle estimate and a suspension roll angle $\phi$ based on a suspension model and lateral acceleration signal by the formula $$\frac{d}{dt}\begin{bmatrix} \phi \\ \dot{\phi} \end{bmatrix} = \begin{bmatrix} 0 & 1 \\ -k & -c \end{bmatrix}\begin{bmatrix} \phi \\ \dot{\phi} \end{bmatrix} + \begin{bmatrix} 0 \\ h \end{bmatrix} \cdot a_y$$

where k is the suspension roll stiffness, c is the suspension damping and h is the length of a moment arm.

In step 36, a fictitious lateral velocity estimation error is determined. The fictitious lateral velocity estimation error is determined by integrating the difference between the 'unbiased' lateral velocity derivative measurement obtained in step 34 and the derivative of an estimated lateral, subtracting the product of the fictitious estimation error and a pre-calibrated forgetting factor, $\lambda$. That is, $$FictitiousEstError = \int \left( [\dot{v}]_{measured} - \left[\frac{d}{dt}\hat{v}\right]_{observer} - \lambda \cdot FictitiousEstError \right) dt$$

The term fictitious refers to the fact that the true estimation error is unknown since the true lateral velocity is unknown. The fictitious lateral velocity estimation error is essentially a "leaky" integration of the difference. As will be further described below, the observer stability ensures the steady state estimation error tends toward zero at steady state. The forgetting factor is used to guarantee the stability of the fictitious lateral velocity estimation error in and of itself. This is an important difference between prior known methods using high pass filtering and the present invention. That is, one guarantees the estimated lateral velocity tends toward zero at steady state and the other guarantees the fictitious estimation error goes toward zero. Obviously, steady state velocity is not necessarily zero. Therefore the approach of U.S. Pat. No. 5,676,433 is not desirable. In the approach of the present invention, the adaptive observer attempts to ensure the true estimation error tends to zero as the fictitious one does.

In step 38, an adaptive observer 40 is used having a general vehicle model 42 and a parameter identifier 44. The vehicle model 42 is coupled to the parameter identifier 44. The fictitious estimation error from step 36 is used by adaptive observer 40 in step 38 to draw the adaptation scheme. Various signals are shown input to step 38 such as vehicle speed, steering angle, and yaw rate and illustrative of the other signals to be used However, those skilled in the art would recognize other signals from other sensors may also be considered by adaptive observer. The adaptive observer adapts the parameters in a physical model and estimates the lateral velocity to be used by the equation:

$$\dot{\hat{x}} = A\hat{x} + Bu + L(y - C\hat{x})$$
$$\dot{\hat{\theta}} = P.err$$

where err=fictitious estimation error from step 36,
or err=function of [fictitious error; measure yaw rate-estimated yaw rate]
where x=[v; $\omega$],
where A, B and C are state matrices, L and P are controller/observer/adapter gain matrix.

Thus, as can be seen, various road conditions such as bank. angle and dynamic conditions of the vehicle are compensated. for in the fictitious estimation error. The fictitious estimation error thus. generated ensures the stability of an adaptive observer which in turn guarantees the steady state estimation error tends toward zero. Therefore, the present invention is believed to generate more accurate estimate of lateral velocity than known methods.

In operation, the method is preferably performed in an iterative fashion. That is, the lateral velocity of the vehicle is continually updated. The various sensors also provide updated information such as vehicle speed, roll angle, steering wheel angle, yaw rate and lateral acceleration to the controller 16 in which the lateral velocity estimator 18 resides. The lateral velocity estimator 18 may provide an updated lateral velocity signal to a stability control program for various functions including, but not limited to, preventing various undesirable yaw conditions of the vehicle.

While particular embodiments of the invention have been shown and described, numerous variations alternate embodiments will occur to those skilled in the art. Accordingly, it is intended that the invention be limited only in terms of the appended claims.

What is claimed is:

1. A method of determining lateral velocity of a vehicle comprising the steps of:
   determining an unbiased lateral velocity derivative;
   creating a fictitious lateral velocity estimation error in response to the unbiased lateral velocity derivative; and,
   determining a lateral velocity by feeding the fictitious lateral velocity estimation error into an adaptive sliding mode observer.

2. A method as recited in claim 1 wherein prior to the step of feeding, filtering the fictitious lateral velocity estimation error.

3. A method as recited in claim 2 wherein the step of filtering comprises the step of high pass filtering the lateral velocity estimation error.

4. A method as recited in claim 1 wherein the step of creating a fictitious lateral velocity estimation error comprises the step of integrating the difference of the unbiased lateral velocity derivative and an estimated lateral velocity derivative.

5. A method as recited in claim 1 wherein the step of creating a fictitious lateral velocity estimation error comprises the step of integrating the difference of the unbiased lateral velocity derivative, an estimated lateral velocity derivative, and the product of a forgetting factor multiplied by a previous fictitious lateral velocity estimation error.

6. A method as recited in claim 1 wherein the step of creating a fictitious lateral velocity estimation error comprises the step of high-pass filtering the integration of the difference of the unbiased lateral velocity derivative and an estimated lateral velocity derivative.

7. A method as recited in claim 1 wherein the step of measuring an unbiased lateral velocity derivative comprises the steps of obtaining the unbiased lateral velocity derivative by the formula:

$$\dot{v} = a_{y-\omega \cdot u} + g \sin\phi$$

where $a_y$ is the lateral acceleration signal, $\omega$ is the yaw rate signal, u is the vehicle speed, $\phi$ is the vehicle roll angle.

8. A method as recited in claim 7 wherein the roll angle is based on lateral acceleration and determined by the formula:

$$\frac{d}{dt}\begin{bmatrix}\phi\\\dot{\phi}\end{bmatrix} = \begin{bmatrix}0 & 1\\-k & -c\end{bmatrix}\begin{bmatrix}\phi\\\dot{\phi}\end{bmatrix} + \begin{bmatrix}0\\h\end{bmatrix} \cdot a_y.$$

9. A method as recited in claim 7 wherein the roll angle is estimated based on a lateral acceleration signal.

10. A method of determining lateral velocity of a vehicle comprising the steps of:
    measuring an unbiased lateral velocity derivative;
    determining a fictitious lateral velocity estimation by integrating an error of an estimated lateral velocity derivative and,
    feeding the fictitious lateral velocity estimation error into an adaptive observer to obtain a lateral velocity of the vehicle.

11. A method as recited in claim 10 wherein the step of determining comprises determining a fictitious lateral velocity estimation by integrating an error of an estimated lateral velocity derivative with a forgetting factor to ensure the fictitious error tends-to zero at steady state.

12. A method as recited in claim 10 wherein the step of determining a lateral velocity using an observer is a function of vehicle speed, steering angle and yaw rate.

13. An apparatus for determining lateral velocity of an automotive vehicle comprising:
    a vehicle speed sensor for generating a vehicle speed signal;
    a roll angle sensor for generating a roll angle signal;
    a yaw rate sensor for generating a yaw rate signal;
    a lateral acceleration sensor for sensing lateral acceleration; and,
    a controller for determining an 'unbiased' lateral velocity derivative as function of the lateral acceleration signal, the yaw rate signal, the vehicle speed signal, and the roll angle signal, and determining a fictitious lateral velocity estimation error as a function of the estimated lateral velocity derivative, the 'unbiased' lateral velocity derivative, and a forgetting factor, and obtaining a lateral velocity of the vehicle therefrom.

14. An apparatus as recited in claim 13 wherein the step of obtaining lateral velocity is a function of vehicle speed, steering angle, and yaw rate.

* * * * *

UNITED STATES PATENT AND TRADEMARK OFFICE
CERTIFICATE OF CORRECTION

PATENT NO. : 6,477,480 B1
DATED : November 5, 2002
INVENTOR(S) : Hongtei Eric Tseng and Davorin David Hrovat It is certified that error appears in the above-identified patent and that said Letters Patent is hereby corrected as shown below:

Column 3,
Line 52, the formula should be $$\dot{v} = a_y - \omega \cdot u + g \sin \phi$$

Column 4,
Line 1, the formula should be $$\frac{d}{dt}\begin{bmatrix} \phi \\ \dot{\phi} \end{bmatrix} = \begin{bmatrix} 0 & 1 \\ -k & -c \end{bmatrix}\begin{bmatrix} \phi \\ \dot{\phi} \end{bmatrix} + \begin{bmatrix} 0 \\ h \end{bmatrix} \cdot a_y$$

Lines 15-20, the formula should be $$\dot{\hat{x}} = A\hat{x} + Bu + L(y - Cx)$$

$$\dot{\hat{\theta}} = P \cdot err$$

Column 5,
Line 53, the formula should be $$\dot{v} = a_y - \omega \cdot u + g \sin \phi$$

Column 6,
Lines 8-12, the formula should be $$\frac{d}{dt}\begin{bmatrix} \phi \\ \dot{\phi} \end{bmatrix} = \begin{bmatrix} 0 & 1 \\ -k & -c \end{bmatrix}\begin{bmatrix} \phi \\ \dot{\phi} \end{bmatrix} + \begin{bmatrix} 0 \\ h \end{bmatrix} \cdot a_y$$

Signed and Sealed this

Twenty-ninth Day of April, 2003

JAMES E. ROGAN
*Director of the United States Patent and Trademark Office*